(12) United States Patent
Wurm et al.

(10) Patent No.: US 9,414,300 B2
(45) Date of Patent: Aug. 9, 2016

(54) ESTABLISHMENT OF WIRELESS COMMUNICATIONS

(71) Applicant: SecureAll Corporation, Mountain View, CA (US)

(72) Inventors: Michael Wurm, Redwood City, CA (US); Arun Kumar Sharma, Cupertino, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

(21) Appl. No.: 13/691,626

(22) Filed: Nov. 30, 2012

(65) Prior Publication Data

US 2013/0136046 A1    May 30, 2013

Related U.S. Application Data

(60) Provisional application No. 61/565,450, filed on Nov. 30, 2011.

(51) Int. Cl.
| *H04W 48/16* | (2009.01) |
| *H04W 76/00* | (2009.01) |
| *H04W 52/02* | (2009.01) |
| *H04W 8/00* | (2009.01) |

(52) U.S. Cl.
CPC .......... *H04W 48/16* (2013.01); *H04W 52/0225* (2013.01); *H04W 8/005* (2013.01)

(58) Field of Classification Search
CPC ............ H04W 48/16; H04W 52/0225; H04W 40/005; H04W 8/005
USPC .......................................................... 370/311
See application file for complete search history.

(56) References Cited

U.S. PATENT DOCUMENTS

| 7,689,196 | B2 | 3/2010 | Hutchinson et al. |
| 8,194,571 | B2 | 6/2012 | Herrmann et al. |
| 8,233,420 | B2 | 7/2012 | Choi et al. |
| 8,391,260 | B1 * | 3/2013 | Kopikare et al. ............. 370/338 |
| 8,428,079 | B1 * | 4/2013 | Lambert et al. ............... 370/461 |
| 8,693,453 | B2 * | 4/2014 | Priyantha et al. ............. 370/338 |
| 8,717,923 | B2 * | 5/2014 | Vedantham et al. .......... 370/252 |
| 2007/0105548 | A1 | 5/2007 | Mohan et al. |
| 2007/0286136 | A1 * | 12/2007 | Rittle et al. ................... 370/338 |
| 2008/0031208 | A1 * | 2/2008 | Abhishek et al. ............. 370/338 |
| 2009/0287827 | A1 | 11/2009 | Horn et al. |
| 2010/0260114 | A1 | 10/2010 | Vermani et al. |
| 2011/0069649 | A1 | 3/2011 | Gobriel et al. |
| 2011/0161697 | A1 * | 6/2011 | Qi et al. ........................ 713/320 |
| 2012/0045989 | A1 * | 2/2012 | Suumaki et al. ............. 455/41.1 |
| 2012/0170751 | A1 | 7/2012 | Wurm |
| 2013/0028293 | A1 * | 1/2013 | Makh et al. ................... 375/132 |
| 2013/0109313 | A1 * | 5/2013 | Kneckt et al. ................ 455/41.2 |

(Continued)

OTHER PUBLICATIONS

Joseph Polastre et al., "Versatile Low Power Media Access for Wireless Sensor Networks," SenSys '04, Nov. 3-5, 2004, Baltimore, Maryland, USA (ACM).

(Continued)

*Primary Examiner* — Ahmed Elallam
(74) *Attorney, Agent, or Firm* — Haynes and Boone, LLP

(57) ABSTRACT

Wireless communication protocols are provided for wireless device discovery, preferably (but not necessarily) with low power consumption. Some protocols are suitable for wireless locks and keys (e.g. smart cards and card readers).

4 Claims, 11 Drawing Sheets

(56) References Cited

U.S. PATENT DOCUMENTS

2013/0109314 A1* 5/2013 Kneckt et al. .............. 455/41.2
2013/0155925 A1* 6/2013 Priyantha et al. ............ 370/311

OTHER PUBLICATIONS

Wei Ye et al., "An Energy-Efficient MAC Protocol for Wireless Sensor Networks," (2002), 7 pages.
A. El-Hoiydi et al., "Low Power MAC Protocols for Infrastructure Wireless Sensor Networks," No later than Nov. 15, 2012.
CMPE 25: Wireless and Mobile Networking SET 3p: Medium Access Control Protocols, 2004.
Michael Buettner et al., "X-MAC: A Short Preamble MAC Protocol for Duty-Cycled Wireless Sensor Networks," SenSys '06, Nov. 1-3, 2006.
Chih-Min Chao et al., A Quorum-Based Energy-Saving MAC Protocol Design for Wireless Sensor Networks, IEEE Transactions on Vehicular Technology, vol. 59, No. 2, Feb. 2010.
Yu-Chee Tseng, et al., "Power-Saving Protocols for IEEE 802.11-Based Multi-Hop Ad Hoc Networks," IEEE INFOCOM 2002.
Yuan Li et al., "Energy and Latency Control in Low Duty Cycle MAC Protocols," USC/ISI Technical Report ISI-TR-595, Aug. 2004.
Prabal Dutta et al., "Practical Asynchronous Neighbor Discovery and Rendezvous for Mobile Sensing Applications," SenSys '08, Nov. 5-7, 2008, Raleigh, NC, USA (ACM).
Arvind Kandhalu et al., U-Connect: A Low-Latency Energy-Efficient Asynchronous Neighbor Discovery Protocol, IPSN '10, Apr. 12-16, 2010, Stockholm, Sweden (ACM).
Shouwen Lai, Heterogeneous Quorum-Based Wakeup Scheduling for Duty-Cycled Wireless Sensor Networks, Dissertation, May 5, 2009, 71 pages.
Andreas Meier, "Analyzing MAC Protocols for Low Data-Rate Applications," May 16, 2006, 16 pages, Computer Engineering and Networks Laboratory.
International Search Report and Written Opinion mailed Mar. 14, 2013 in related International Appl. No. PCT/US2012/067478, 7 pages.

* cited by examiner

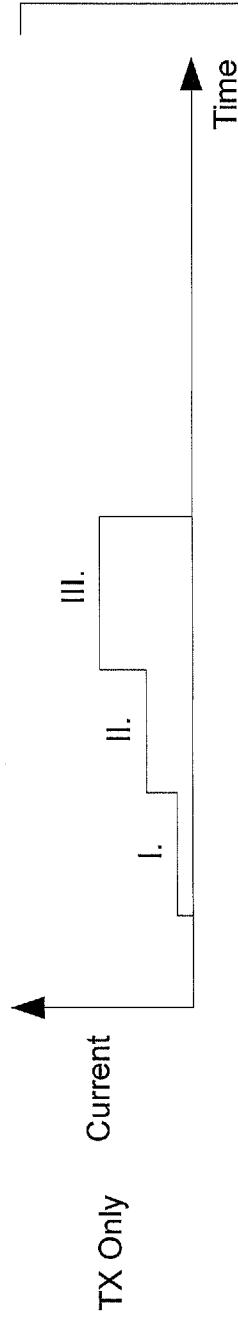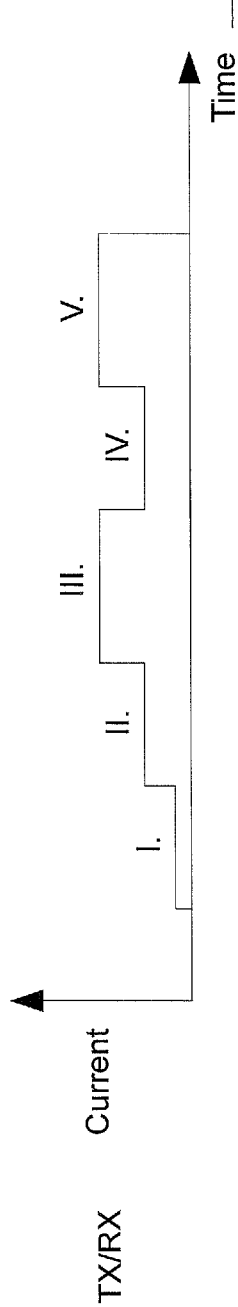
FIG. 5
FIG. 6

ESTABLISHMENT OF WIRELESS COMMUNICATIONS

CROSS REFERENCE TO RELATED APPLICATIONS

The present application claims priority of U.S. provisional application No. 61/565,450, filed Nov. 30, 2011, incorporated herein by reference. The patent incorporates by reference the PCT application no. PCT/US2012/067478, filed on Nov. 30, 2012 by SecureAll Corporation, naming Arun Sharma and Michael Wurm as the inventors, entitled "ESTABLISHMENT OF WIRELESS COMMUNICATIONS".

BACKGROUND OF THE INVENTION

The present invention relates to wireless communications between devices. Some embodiments are suitable for devices one or more of which are mobile.

Wireless communications have been described in the following references:

[1] Joseph Polastre, Jason Hill, David Culler, Versatile Low Power Media Access for Wireless Sensor Networks, *SenSys* '04, Nov. 3-5, 2004, Baltimore, Md., USA (ACM).

[2] Wei Ye, John Heidemann, Deborah Estrin, An Energy-Efficient MAC Protocol for Wireless Sensor Networks (2002).

[3] Michael Buettner, Gary V. Yee, Eric Anderson, Richard Han, X-MAC: A Short Preamble MAC Protocol for Duty-Cycled Wireless Sensor Networks, *SenSys* '06, Nov. 1-3, 2006, Boulder, Colo., USA (ACM).

[4] Yu-Chee Tseng, Chih-Shun Hsu, Ten-Yueng Hsieh, Power-Saving Protocols for IEEE 802.1 1-Based Multi-Hop Ad Hoc Networks, IEEE INFOCOM 2002.

[5] Yuan Li, Wei Ye, John Heidemann, Energy and Latency Control in Low Duty Cycle MAC Protocols, USC/ISI Technical Report ISI-TR-595, August 2004.

FIG. 1 illustrates an exemplary wireless network of devices 110. Each device 110 includes a radio transceiver 120 which in turn includes a transmitter 120T and a receiver 120R that are connected to an antenna 130. The device 110 typically also includes a computer processor (processing unit) 140 and a memory 150 which stores data and computer instructions executed by processor 140. The device is powered by a power source 160, usually a battery.

A device 110 can be a single function device such as a wireless key, but may also be a multifunction device, e.g. a smart mobile phone that can make telephone calls and possibly perform other functions, such as sending emails, editing documents, and so on.

Many network topologies are available for wireless devices. One example is the conventional star topology—when the devices 110 communicate through a central device (not shown). Another example is mesh networks, including ad-hoc peer to peer networks; in an ad-hoc network any device 110 can serve as a router to pass messages between other devices.

Small size is a very desirable attribute for a mobile device, but this limits the size of battery 160 and hence limits the battery energy budget. This leads to more frequent battery replacement or recharging, which is undesirable.

The wireless radios 120/130 can be quite sophisticated, and can use complex modulation and protocols to maximize throughput in a multi-user scenario, while at the same time operating in limited available bandwidth. However, the sophisticated operation may require more operating power for the radio in transmit or receive mode.

In some protocols, to conserve battery power, the devices intermittently turn off their radio transmitters 120T and receivers 120R. These duty-cycle based communication protocols allow the radio 120 to remain in a low-power energy saving state most of the time.

In such duty-cycle based communication, there are initial discovery and synchronization operations in which the devices 110 discover each other and agree on timeslots and radio channels for communication. This synchronization or discovery protocol should also be energy efficient in order to extend battery life of the devices. For time critical application the protocol should help realize low latency in establishing communication.

Much of prior art is concerned with wireless sensor networks and the forwarding of data packets between wireless sensor nodes in a way that uses the least amount of energy. Such a network is typically a mesh network in which all nodes 110 are the same kinds of devices and communication should be possible between each pair of nodes.

As noted above, energy can be saved by duty-cycling the radio 120 of each device 110, which means that the radio 120 is not turned on all the time. In order for two devices 110 to communicate, there must be time when their radios are simultaneously on. The challenge is to find a protocol that has a low duty-cycle and at the same time low latency (that means a short time between these intersects).

One method is to have all devices 110, or groups of such devices, synchronized and have them wake up all at the same time. An example of such a protocol is presented in [5]. (The bracketed numbers refer to the references cited above.) However, time synchronization is difficult, especially when some devices 110 are movable and may enter and leave areas of network coverage.

A simple protocol that avoids time synchronization is B-MAC, in which a device 110 periodically wakes up and listens on the radio channel for a short time, and when it senses an ongoing transmission it keeps its radio 120 in receive mode until the transmission is over. FIG. 2 illustrates an exemplary timing for two devices 110, say 110.1 and 110.2. Each device 110.1 periodically turns on its receiver 120R to listen for possible transmissions. The listening periods are shown as pulses 210. When a device (such as 110.2) needs to transmit a data packet 220, the device sends the packet with a long preamble 230. Preamble 230 is long enough to be detected by any listening device. In particular, the preamble length T1 is longer than the period T2 of pulses 210. The preamble 230 contains no useful information, its only purpose is that other devices can detect an ongoing transmission and remain in receive mode. In FIG. 2, device 110.1 detects the preamble and remains in receive mode as shown at 250. When device 110.2 starts transmitting the packet 220, device 110.1 determines whether or not the packet is addressed to the device 110.1, and if so then device 110.1 receives the packet.

Another approach is that the devices 110 have a precise clock for timing such that all devices stay synchronized for a long duration, if not always. This approach is limited since it requires an affordable but accurate clock that consumes minimal operating power.

In [4], Tseng presents a "periodically-fully-awake" protocol that is illustrated in FIG. 3. Here, each device transmits beacon packets 310 at regular intervals. Each beacon packet 310 is followed by a window 312 during which data may be transferred. Every n-th beacon interval (n=3 in FIG. 3), each device has the radio in listen mode for a longer period of time to be able to receive beacon packets from other devices.

SUMMARY

Some embodiments of the invention provide novel discovery protocols at least some of which can be realized with a low power consumption.

BRIEF DESCRIPTION OF THE DRAWINGS

FIG. 5 is a block diagram of information transmitted in discovery operations according to some embodiments of the present invention.

FIG. 6 illustrates consumption of electrical current in some embodiments of the present invention.

DESCRIPTION OF SOME EMBODIMENTS

The embodiments described in this section illustrate but do not limit the invention. The invention is defined by the appended claims.

Some embodiments of the present invention provide discovery methods and systems with low power consumption. Some embodiments are suitable for networks with asymmetric device functionality. For example, in secure access systems such as used for smart-key entry to a building or other secured area, or for access to a computer or other equipment, a wireless key (e.g. so-called U-key, e.g. a smart card) needs to communicate with a lock or other protective device (e.g. a card reader). The invention is not limited to keys and locks, but in some embodiments, the system has two types of devices, say a first type (e.g. a lock) and a second type (e.g. a key) with the following features:

The first type is able to communicate with the second type.

It is not required for the first type devices to communicate with each other.

It is not required for the second type devices to communicate with each other.

The following terminology will be used herein:

Class A Device: A first type device (such as a lock) that intermittently broadcasts packets. (As used herein, the term "broadcast" includes multicast. The broadcast (or multicast) designation may be indicated by an address in the packet, but there may also be no such address: the packet may be for reception by one or more specific types of service or devices.)

Class B Device: A second type device (such as a key) that intermittently enters receive mode with the intention of receiving broadcasts from a class A device.

Class AB Device: A device that combines the functions of a class A and a class B device. Of note, the invention is not limited to the building security systems; some aspects relate to networks with Class AB devices.

Class C Device: A first type device that intermittently broadcasts bursts of short packets (rather than just single packets).

Class D Device: A second type device that intermittently enters receive mode with the intention of receiving at least one packet from a burst of a class C device.

In some embodiments, a system includes two classes of devices: class A and class B. The discovery protocol allows devices of class A to discover devices of class B.

In some embodiments, a discovery protocol is provided which allows any device, of any class, to discover any other device.

Figure 4:
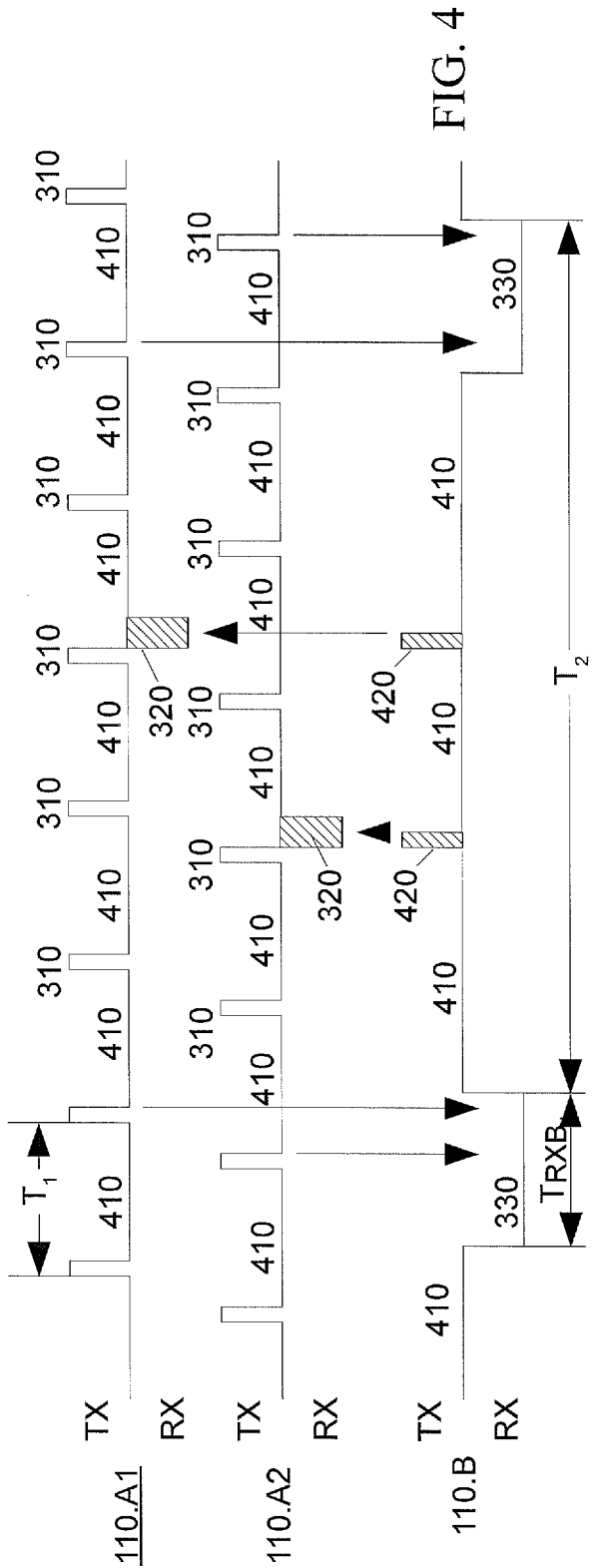
FIG. 4 is a timing diagram of discovery operations according to some embodiments of the present invention.

FIG. 4 illustrates discovery timing according to some embodiments of the present invention. These embodiments include class A devices 110.A1 and 110.A2, and a class B device 110.B. The class A devices can be card readers for example, and the class B device can be a wireless key (a smart card for example). In some embodiments, the class A devices are stationary, but the class B device is mobile. In other embodiments, one or both of class A devices 110.A1, 110.A2 are mobile, and the class B device may or may not be stationary. In some embodiments, there are many class A and class B devices which move in and out of each other's communication range. Each class A device seeks to discover class B devices and may seek to decide whether or not to communicate with any of the class B devices. Each class B device may seek to decide whether or not to communicate with any of the class A devices.

Each device of class A (such as 110.A1 and 110.A2) periodically transmits a broadcast packet 310 at regular intervals T1. Broadcast packets are packets not addressed to any particular class B device, and "broadcast" includes "multicast" as stated above. There is a sleep period 410 after each broadcast packets 310 to conserve power. Periodically, the class A device is placed into receive mode (at 320) to listen for responses from class B devices.

Each broadcast packet 310 may contain the following information (FIG. 5):

(i) An identifier 510 of the transmitting device (110.A1 or 110.A2 for example). This could include the identifier of the network to allow multiple networks to coexist.

(ii) A radio channel 520 that can be used to contact the transmitting device during the transmitting device's timeslot 320.

(iii) Information 530 identifying at least one timeslot 320 (could be given as an offset relative to the broadcast packet 310) during which the transmitting device can be contacted. The timeslot 320 could be the next such timeslot, or could be some other future timeslot 320. Information 530 can identify multiple timeslots 320. For example, information 530 may indicate a time schedule, relative to the current packet 310, on which the timeslots 320 will occur (e.g. every 100 ms following the current packet). In FIG. 4, one listening timeslot 320 is provided after a sequence of multiple packets 310. In other embodiments, one timeslot 320 is provided after each packet 320. In FIG. 4, the packet 310 timing, including the interval between any two packets 310, remains constant; the timeslots 320 fit between packets 310 without changing the interval between the packets.

(iv) Authentication information 540 that can be used by a class B device to validate the broadcast. For example, the authentication information 540 may include a counter and a cryptographic message authentication code.

(v) An indication 550 of whether the transmitting device has one or more data packets waiting to be transmitted, and the addresses of the destination devices. A class B device may take this indication into account when deciding whether or not to respond to the transmitting device in the next timeslot 320. For example, in a building security embodiment, a card reader's indication 550 may indicate whether or not the class A device has updates to cryptographic keys for one or more wireless keys. See e.g. U.S. Pre-Grant Patent Publication no. 2012/0170751 published Jul. 5, 2012, incorporated herein by reference. Even though the packets 310 may thus contain the addresses of the destination devices, the packets 310 are still broadcast packets because they are used for discovery of both destination devices and other devices.

The packet of FIG. 5 is exemplary. Other information may be present, and some information may be omitted.

Each class B device (e.g. 110.B) periodically turns on its receiver 120R for a listening period 330 of a length $T_{RXB}$ greater than or equal to T1 ($T_{RXB} \geq T1$). This relationship between $T_{RXB}$ and T1 guarantees that the B device will receive broadcast packets 310 from all class A devices that are within the communication distance. The class B device repeats the listening periods 330 as desired, for example with a period $T_2$. When a class B device receives packets 310, the class B device initiates a pair-wise communication session with the class A device. In some embodiments, the class B device may or may not initiate the communication session, i.e. it first makes a decision whether or not to initiate the communication. This decision can be based on:

(i) The content of the received packet 310, for example the device ID 510 or the authentication information 540.

(ii) The received signal strength, for example if the B device must communicate only with class A devices within a certain distance.

Each broadcast packet 310 supplies the class B device with all the information it needs in order to establish communication with the respective class A device. In the example of FIG. 4, the class B device 110.B decides to communicate with each device 110.A1, 110.A2, and transmits a packet 420 to each of the two class A devices in their respective timeslots 320. The packets 420 can be transmitted according to any suitable protocol. Each packet 420 may contain any desired information, e.g. may identify the class B device, or may simply indicate that a class B device is present. The protocol may be predefined, or defined by a field (not shown) in the packet 310.

The purpose of the packet 420 transmission may be solely to inform the corresponding device 110.A1 or 110.A2 of the presence of device 110.B. But packet 420 could also initiate further communication between the device 110.B and the corresponding device 110.A1 or 110.A2 according to a different protocol. The further communication may include, but is not limited to:

(1) Authentication.
(2) Data communication.
(3) Emergency messaging and/or broadcast.
(4) Communication to estimate the distance between the device 110.B and the respective device 110.A1 or 110.A2 using any one or both of:
    (4a) RSSI (received signal strength indicator) amongst a set of antennas with specific radiation polarization;
    (4b) Time of Flight measurement;
(5) Communication to estimate relative spatial orientation between the device 110.B and the respective device 110.A1 or 110.A2 using any one or both of:
    (5a) RSSI (received signal strength indicator) amongst a set of antennas with specific radiation polarization;
    (5b) Time of Flight measurement.

As mentioned above, class A devices do not need to offer a receive timeslot after each broadcast 310 if the broadcast contains the time offset of the next receive timeslot 320. This can lead to energy savings on the order of 50%, as illustrated in FIG. 6. This figure shows exemplary graphs of the electric current consumption versus time. The top graph illustrates a transmission of a packet 310. The bottom graph illustrates the packet 310 transmission immediately followed by a packet reception in a timeslot 320. The following notation is used:

"I" is the crystal oscillator startup time assuming that the clock was turned off in sleep mode, i.e. at 410 (a typical clock uses a crystal oscillator);

"II" indicates PLL (phase locked loop) locking and ramp-up time;

"III" indicates transmit mode (packet 310 transmission);

"IV" indicates PLL locking and ramp-up time for reception in timeslot 310;

"V" indicates receive mode.

Clearly, if every packet 310 is followed by a listening timeslot 320, the current consumption can be doubled. However, in some embodiments, every packet 310 is followed by a listening timeslot 320.

In some embodiments, the listening timeslots 320 fit between the adjacent packets 310 so that the packets 310 are transmitted regularly with the same interval regardless of whether or not a listening timeslot is included after any particular packet 310.

The average current consumption of a class A device 110 is defined by the transmit current of the radio and the duty cycle $T_{Tx}/T_1$, where $T_{Tx}$ is the time it takes to transmit one broadcast packet 310. On the other hand, the average current consumption of a class B device is defined by the receive current of the radio and the duty cycle $T_{RXB}/T_2$.

If for example $T_{RXB}=T1$, then the average current consumption of a class B device is a function of $T_1/T_2$. Clearly, by adjusting $T_1$, it is possible to trade the current consumption of class A devices against the current consumption of class B devices. At the same time, it is possible to adjust T2 to trade the current consumption of class B devices against the maximum latency with which devices can discover each other.

In some embodiments, it is desirable for class B devices to be discoverable only by legitimate class A devices. This can be accomplished, for example, by inserting into each broadcast packet 310 authentication information 540 (FIG. 5). In some embodiments, information 540 includes a counter value and a message authentication code (MAC). If a class B device possesses the cryptographic key used to generate the MAC, then the class B device can verify whether or not the MAC is valid. (Information 540 may include an identification, such as a version number, of the cryptographic key.) The class B device replies to the packet 310 only if the MAC is valid and the counter value has not been used before. For example, in some embodiments, the counter is based on the current time $t_A$ as measured by the clock (not shown) of the class A device; a class B device will reject values that lie in the past by a certain margin $\Delta t$, i.e. the values less than $t_B - \Delta t$ where $t_B$ is the current time as measured by the clock (not shown) of the class B device. The margin $\Delta t$ depends on how tightly the time can be synchronized between all devices in the network. Replay attacks may still be possible, but only for the duration of the time margin Δt.

The timeslots 320 and radio channels (520) for response packets 420 can be randomized for enhanced security. Any information in packet 310 can be encrypted. For example, the fields 520 and/or 530 can be encrypted.

Two or more class B devices may try to communicate with a class A device in the same timeslot 320. Two possible outcomes are illustrated respectively in part I and part II of FIG. 7 when the class B devices transmit their response packets 420:

Part I: The signal of one class B device (device 110.B1) is significantly stronger than the combined signal of the other class B devices. The class A device 110.A correctly receives the strong packet 420 and does not notice that other class B devices have attempted to respond.

Part II: The class A device 110.A cannot receive any response packet 420 correctly. In this case, however, the class A device can sample the RF (radio frequency) energy and make a guess whether there were responses or not.

The examples of FIG. 7 will now be described with respect to time points "a.", "b.", etc. as marked in the figure.

Part I shows a possible arbitration protocol for the case where the class A device 110.A correctly receives the response from class B device 110.B1 but not from class B device 110.B2. At time points a., b., c., the following events happen:

a. When device 110.A offers a listening timeslot 320, the class B devices 110.B1 and 110.B2 send their response packets 420 at the same time. Each packet 420 identifies the respective device 110.B1 or 110.B2. However, the response of device 110.B1 masks the response of 110.B2, i.e. class A device 110.A only hears the response from 110.B1.

b. Class A device 110.A sends an acknowledgment packet 710 back to device 110.B1. Both devices 110.B1 and 110.B2 listen for, and receive, the acknowledgement packet as shown at 720. The packet 710 includes a destination address identifying the device 110.B1. Therefore, device 110.B2 assumes that its response 420 was dropped.

In this embodiment, because there was a response 420 from device 110.B1, the device 110.A assumes that other responses may have been masked, and device 110.A automatically provides one or more additional listening timeslots 320' for other class B devices. These timeslots are shown as 320'.1, 320'.2, 320'.3, 320'.4 in FIG. 7, four timeslots total; however, any number of timeslots can be added. The additional timeslots 320' may be provided immediately after the acknowledgement packet 710 or at a later time. The timing of timeslots 320' may be fixed by the protocol, or the timeslots 320' may be specified in packet 710. The timeslots can be defined by their offsets relative to acknowledgement packet 710 or packet 310 or some other event.

Additional timeslots 320' are advantageous because they allow faster discovery of additional class B devices when multiple class B devices try to communicate with the class A device at the same or nearly the same time. Further, the additional timeslots 320' are provided only when they may be needed—they are not provided if the class A device 110.A did not receive a response in a regular listening timeslot 320. Therefore, energy consumption is reduced.

Figure 7:
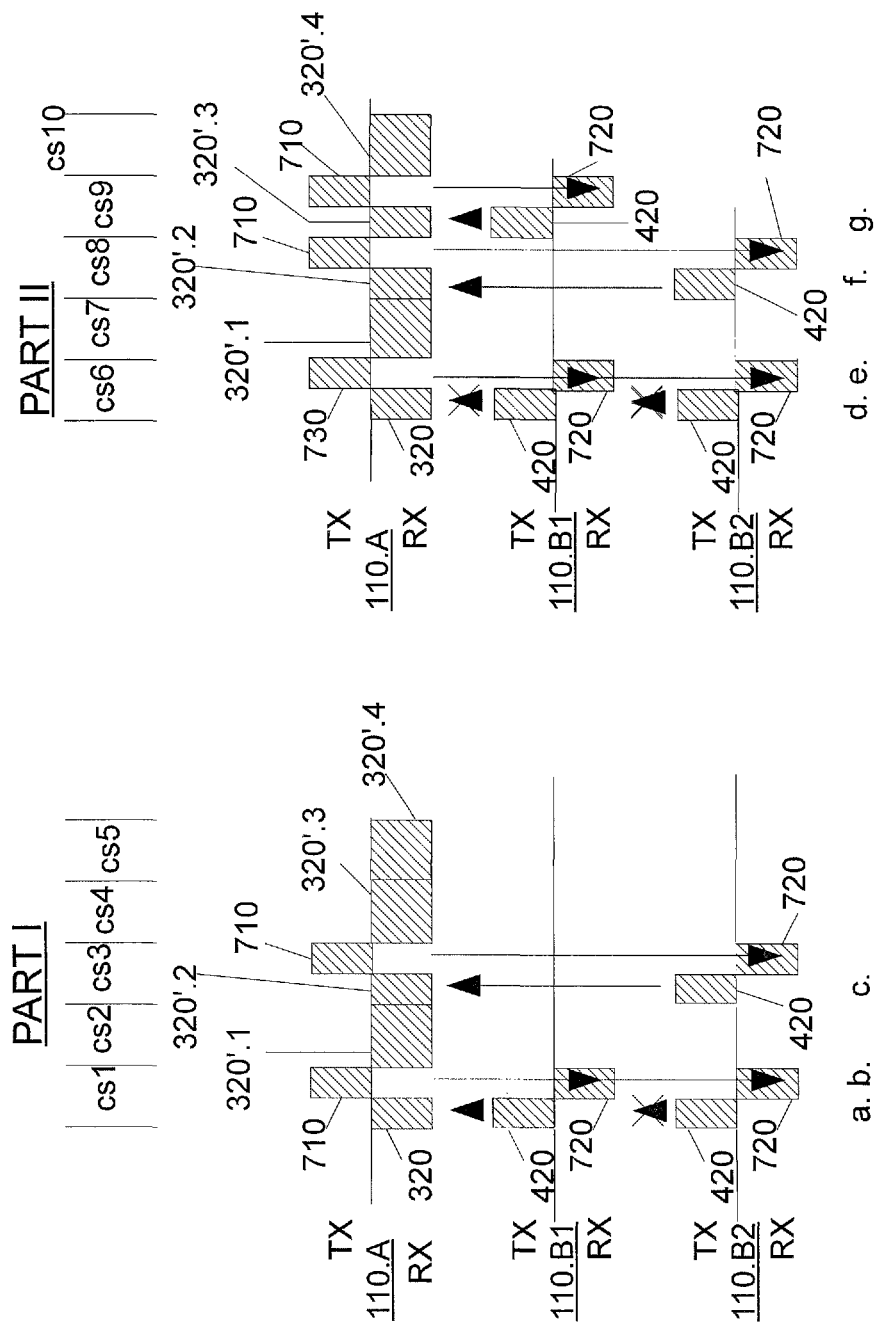
FIG. 7 includes timing diagrams of discovery operations according to some embodiments of the present invention.

In the embodiment of FIG. 7, the time is divided into consecutive communication slots cs1, cs2, cs3, etc. ("communication slots csi" below). Each timeslot 320 or 320' starts at the beginning of a slot csi. Thus, timeslots 320 and 320'.1 through 320'.4 begin in respective communication slots cs1 through cs5. Each timeslot 320 or 320' may last the full length of the respective communication slot csi or only part of the length of csi. More particularly, if the class A device 110.A receives a response 420 some time before the end of the communication slot csi (e.g. in the first half), then the listening operation 320 or 320' is terminated, and the device transmits an acknowledgement packet 710 in the same communication slot csi. In FIG. 7, each of timeslots 320'.1, 320'.3, 320'.4 lasts the full length of the respective communication slot cs2, cs4, cs5, but each of timeslots 320 and 320'.2 lasts only part of the respective communication slot cs1, cs3.

If the class A device does not receive a response at the beginning of a communication slot csi (e.g. in the first half of the slot), the listening operation 320 or 320' may or may not be extended to the end of the communication slot. The invention is not limited to any particular timing or timeslot or communication slot definition however.

The timing of timeslots 320, 320' may be specified by the protocol by specifying the timing of communication slots csi.

c. Device 110.B2 picks one of the additional timeslots 320' (timeslot 320'.2 in slot communication cs3 in the example of FIG. 7) and successfully retransmits its response packet 420. Device 110.A receives the packet 420, and responds with an acknowledgement 710 addressed to device 110.B2. Device 110.B2 receives the acknowledgement at 720. In some embodiments, device 110.A may again offer one or more additional listening timeslots 320' due to receipt of the response 420 from device 110.B2. These additional timeslots may also be specified by the protocol or in the packet 710 transmitted to device 110.B2. In other embodiments, device 110.A does not offer any additional timeslots 320' on receipt of additional responses 420.

After the time point b., the devices 110.A and 110.B1 may also engage in other communication, e.g. for authentication or other purposes. This communication is not shown in the drawings. This communication may, for example, include non-broadcast packets addressed to device 110.A or 110.B1, and/or be conducted in a different radio channel, so as not to interfere with the discovery communications. Further, in some embodiments, these communications and the discovery timeslots 320', 420, 710, 720 are performed between broadcasts 310 so that the broadcasts continue at regular intervals T1. In other embodiments, however, device 110.A may skip one or more broadcasts 310, or otherwise modify the broadcasts' timing, during the communications shown in FIG. 7 and other communications involving the device 110.A.

Part II of FIG. 7 shows a possible arbitration protocol for the case where the class A device 110.A is not able to receive any response correctly:

d. As at time a., devices 110.B1 and 110.B2 send their responses 420 at the same time in listening slot 320 offered by device 110.A. Device 110.A does not receive either of packets 420 correctly. However, device A senses the channel's RF energy and recognizes that some class B devices may have attempted to respond.

e. Therefore, device 110.A broadcasts a NACK packet 730 which is received by both devices 110.B1 and 110.B2 as shown at 720, and device 110.A provides additional listening timeslots 320'. These timeslots can be predefined by the protocol or specified by the NACK packet 730. These timeslots are shown as 320'.1, 320'.2, 320'.3, 320'.4 in FIG. 7, four timeslots total; however, any number of timeslots can be added.

As in Part I, the time is divided in Part II into consecutive communication slots shown as cs6 through cs10. Each timeslot 320 or 320' starts at the beginning of a respective communication slot csi, and may last the full length of the respective slot csi or only part of the length of csi. In the first part (e.g. the first half) of the communication slot csi, if the class A device 110.A receives a response 420 or senses that one or more responses may have been transmitted, then the listening timeslot 320 or 320' is terminated, and the device transmits an acknowledgement packet 710 or NACK 730 in the same communication slot csi.

f., g. Each of devices 110.B1 and 110.B2 randomly selects a timeslot 320' and retransmit its response 420. Device 110.A successfully receives each response 420 and responds with an acknowledgement 710 as described above in connection with Part I.

In some embodiments, more timeslots 320' are added when collisions happen again during retransmissions at time f. or g., or when the device 110.A receives a response without a collision (as in Part I). In other embodiments, no additional timeslots 320' are added in response to any event in a timeslot 320'.

As in Part I, additional timeslots 320' are advantageous in Part II because they allow faster discovery when multiple class B devices try to communicate with the class A device at the same or nearly the same time. Further, the additional timeslots 320' are provided only when they may be needed, thus reducing energy consumption.

Figure 8:
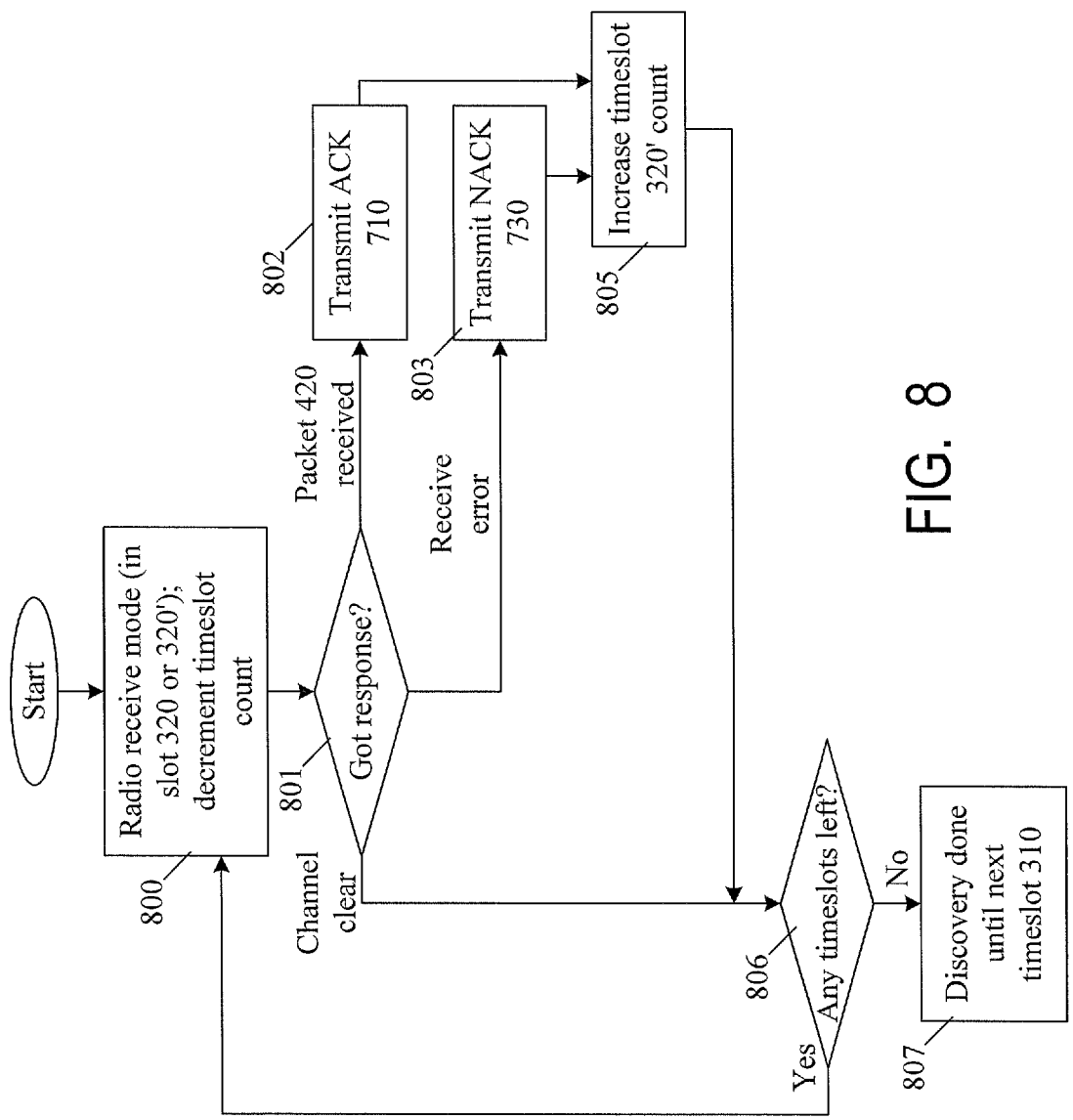
FIGS. 8 and 9 are flow charts of discovery operations according to some embodiments of the present invention.

FIG. 8 is a flow chart of a possible arbitration procedure as an activity diagram for class A device 110.A. In this embodiment, the device 110.A has a timeslot counter in its memory 150 to keep track of timeslots 320 and 320'. The timeslot counter is initialized to some value (e.g. 1) in each timeslot 320. As shown at 800, the class A device puts its radio into receive mode in each timeslot 320 or 320' to receive a response from a class B device, and the class A device decrements its timeslot count. The signal received in the timeslot is tested for at 801 for the following outcomes:

A valid packet 420 is received. The flow goes to 802.
A collision is detected (receive error). The flow goes to 803.
No transmission is detected (channel is clear). The flow goes to 806.

In the first case (at 802), the device transmits acknowledgment 710 and increases the timeslot count (at 805). In the example of FIG. 7, the timeslot count is increased by 4. As described above, in some embodiments the timeslot count is increased only after a timeslot 320 but not after a timeslot 320', but in other embodiments the timeslot count can be increased after any timeslot 320 or 320' according to any desired rule.

In the second case (at 803), the device transmits negative acknowledgment 730 and increases the timeslot count (at 805). In some embodiments, the timeslot count increase after 802 is different than after 803.

In the third case, the flow goes to 806 as stated above. Of note, if there previously was a collision and a NACK was transmitted (at 803), the class B devices will select timeslots 320' randomly as explained above in connection with FIG. 7 Part II. Therefore, some timeslots 320' may be unselected, and have clear channel even though there are still class B devices trying to communicate with the class A device.

In all cases, the flow goes to 806. Here the class A device checks the timeslot count to determine if there are any timeslots left. If so, the device goes back into receive mode (800) at the next timeslot 320'. Otherwise (at 807) the class A device terminates the discovery until the next broadcast 310. For example, the device may turn off the receiver and go to sleep.

As to how many initial timeslots there are and by how much the timeslot count is increased at 805, if at all, and whether or not the timeslots are increased only after timeslot 320 or after subsequent timeslots 320' as well, the rules can be tweaked based on the expected network load and/or other network features. In some embodiments, there may be a maximum number of timeslots; at 805, the timeslot count cannot be increased beyond the maximum number. In some embodiments, all class A devices use the same rules, but this is not necessary.

Figure 9:
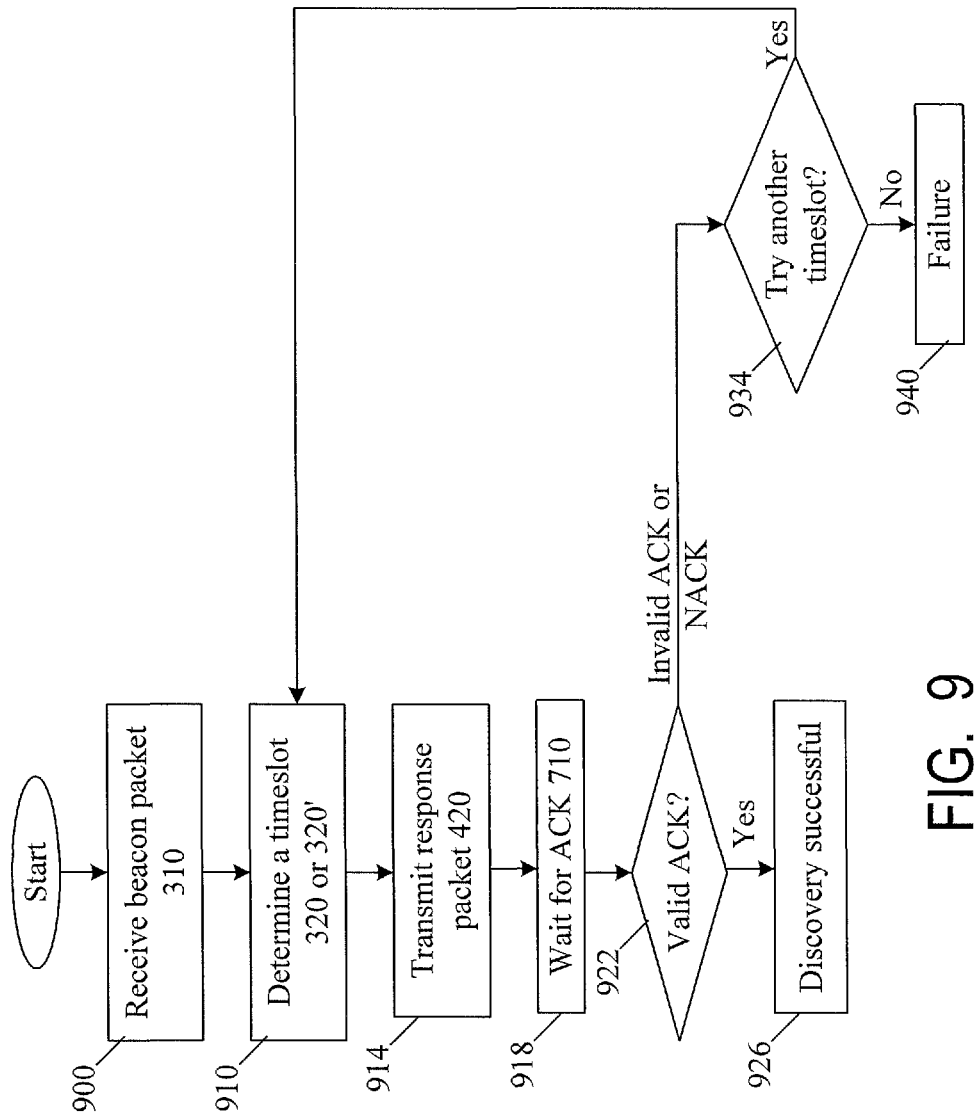

FIG. 9 is a flowchart showing the discovery operation for a class B device. The iterations begin at 910 when the class B device somehow learns of one or more available timeslots 320 or 320' to be offered by a class A device. For example, at 900, the class B device may receive a broadcast packet 310 from a class A device, and may learn of a timeslot 320 from the packet 310. Alternatively, the class B device may enter the communication range of the class A device when the class A device sends a packet 710 or 730 to other devices, and the class B device may learn of a timeslot 320' from such packet 710 or 730.

During the timeslot 320 or 320' determined at 910, the class B device transmits a response packet 420 (at 914). The device then waits for an acknowledgment from the class A device (at 918). The acknowledgement is received and tested as shown at 922. If the acknowledgement is a packet 710 addressed to the class B device itself, then the class B device terminates the discovery as shown at 926. The class B device may perform additional operations such as authentication of the class A device and other communications with the class A device as discussed above.

If the acknowledgement tested at 922 is addressed to another device, or is a NACK packet 730, then the class B device determines at 934 whether it should try another timeslot 320'. In some embodiments, the class B device gives up after the first unsuccessful attempt in timeslot 320': if the timeslot determined at 910 was a timeslot 320, then the answer at 934 is "Yes", i.e. the flow goes back to 910 to determine a timeslot 320', but if the device gets another invalid ACK or NACK at 918 then the answer at 934 is "No", i.e. the class B device goes to 940 (failure) and possibly waits for the next beacon 310 and timeslot 320. In other embodiments, the class B device keeps track of available timeslots, possibly using the same process as the class A device uses at 805 (see FIG. 8). This may be a system-wide process. More particularly, the class B device increases the timeslot count at 934 using the same algorithm as at 805. (However, if the class B device enters the communication range of the class A device when the class A device transmits a packet 710 or 730, then such packet could inform the class B device of the current timeslot count or provide other information on future timeslots 320'.) The class B device also checks for available timeslots using the same algorithm as at 806. In addition, the class B device decrements its timeslot count on each timeslot 320 or 320'.

If there are timeslots left at 934, then the next iteration starts over at 910, i.e. the class B device randomly picks a timeslot 320'. Otherwise the discovery protocol fails (at 940). In this case, for example, the class B device may return to 900 to wait for the next broadcast 310, and/or may perform other action as desired (provide an alarm for example).

It may be desirable that certain parameters, like T1 and T2, and the radio channel that is used for the discovery, be different for different groups of devices or different locations. This would allow energy tradeoffs tailored to specific situations and lift the restriction of requiring a fixed radio channel. For example, the class A devices may be card readers installed in adjacent areas, and each area's card readers may have a set of parameters associated with the area.

Figure 10:
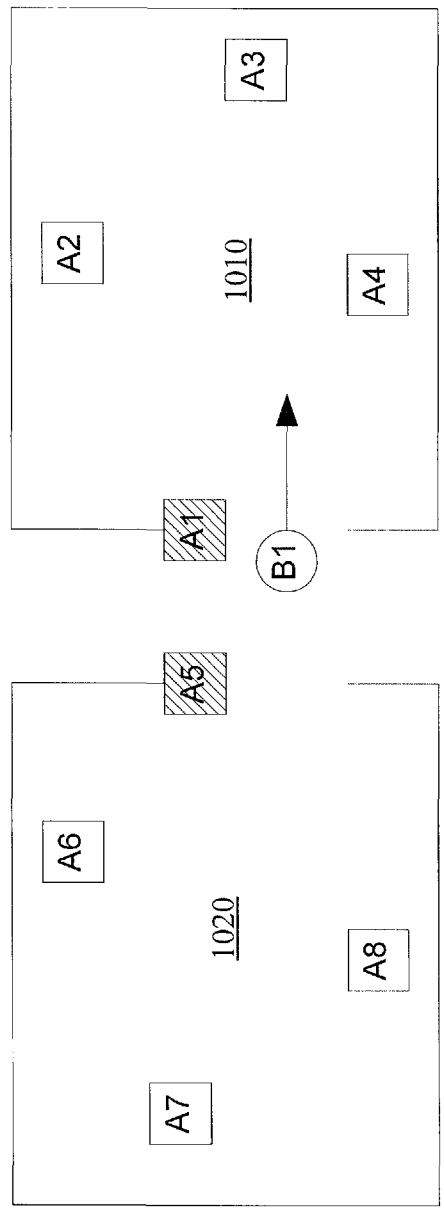
FIG. 10 is a block diagram of two groups of devices that use different discovery protocol parameters according to some embodiments of the present invention.

FIG. 10 shows an example with two different areas 1010 and 1020; area 1010 includes class A devices A1 through A4, and area 1020 includes class A devices A5 through A8. In each area 1010, 1020, the class A devices operate with a common set of parameters. However, devices in different areas may have different parameters.

Class A devices A1 and A5 at the entrance of the respective area 1010 or 1020 will be called "gate devices"; they can communicate with any class B device, no matter how configured.

Figure 11:
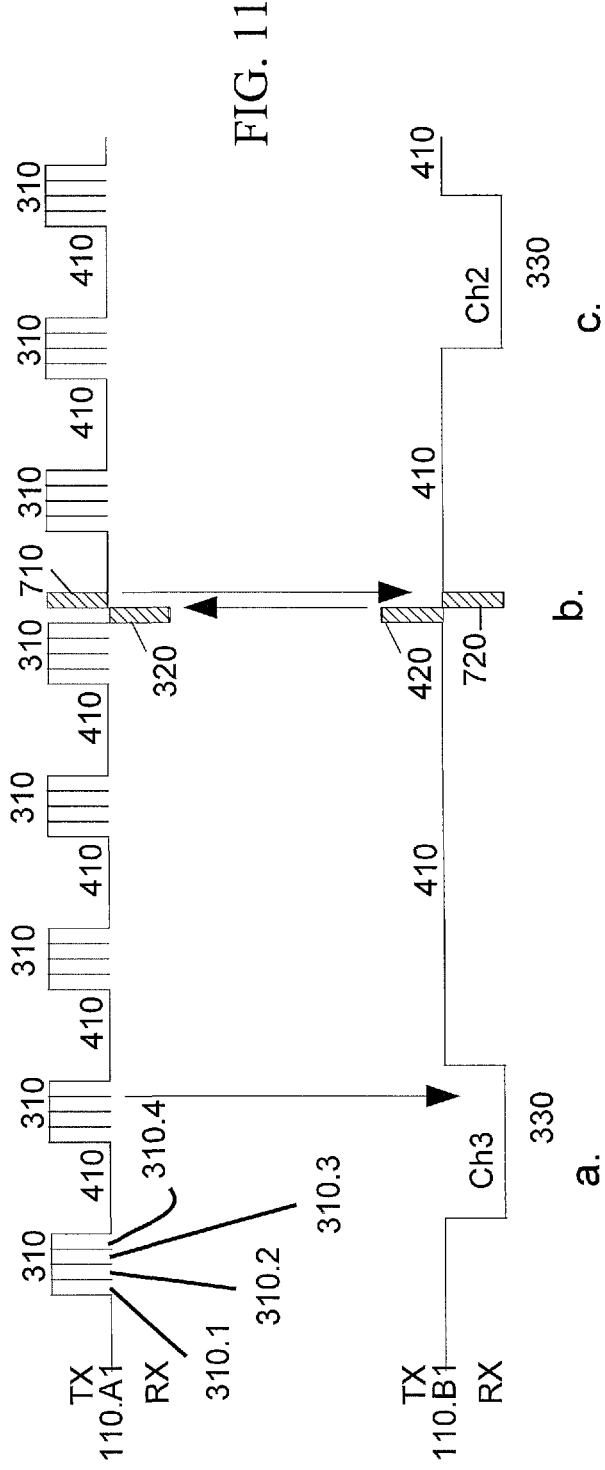
FIG. 11 is a timing diagram of a discovery operation involving multiple groups of "gate devices" according to some embodiments of the present invention.

FIG. 11 illustrates some embodiments of the discovery protocol involving a gate device 110.A1, such as A1 or A5 in FIG. 10, and involving a class B device 110.B1. The class A device 110.A1 is at the entrance of an area, for example a building, and the class A device is used to configure all the class B devices entering the area. The protocol is similar to that of FIG. 4, but each broadcast beacon 310 of gate device 110.A includes a number of consecutively transmitted broadcast beacons—four beacons 310.1 through 310.4 in this example—for recognition by four respective types or configurations of class B devices. Each beacon 310.i includes a packet including the information such as described above in connection with FIG. 5. transmitted according to a respective set of parameters. For example, different beacons 310.i may have different packet formats, and/or be transmitted on different channels. If different beacons are transmitted on respective different channels, they may be transmitted in parallel.

Broadcasts 310 are repeated with a period which is not longer than the listening periods 330 of any class B device.

In the example of FIG. 11, the device 110.B1 listens on a channel 3 in each listening period 330. The following events take place at times a., b., etc.:

a. Device 110.B1 receives at least one beacon packet 310.i from the gate device 110.A1 in listening period 330.

b. In response to the packet 310.i, the device 110.B1 sends a packet 420 in the timeslot 320 specified by the packet 310.i. The gate device 110.A1 responds with an acknowledgement 710 addressed to the device 110.B1. The acknowledgement packet is received as shown at 720. The acknowledgement packet informs the device 110.B1 of network parameters for discovery (for beacons 310) in the area corresponding to the gate device 110.A1. In the example of FIG. 11, the network parameters specify channel 2 for beacons 310. In response, the device 110.B1 reconfigures itself to listen for beacons on channel 2 instead of 3.

c. The device 110.B1 listens on channel 2 in subsequent listening periods 330. In addition, though this is not shown in the figure, the devices 110.B1 and 110.A1 can perform other functions (such as authentication, etc.) as discussed above. For example, if the gate device 110.A1 is a wireless lock for a door, the gate device may unlock the door if appropriate.

In some embodiments, the class B device may receive beacons 310 from multiple gate devices (such as A1 and A5 in FIG. 10), and may respond to any number of such gate devices. For example, in a wireless key embodiment, there may be a case when the class B device is authenticated by only one of the gate devices, or the class B device authenticates only one of the gate devices, so only one of the gate devices opens its lock. In other embodiments, the class B device may be authenticated by, or may authenticate, multiple gate devices, but the class B device may determine the closest gate device (for example, by RSSI or Time of Flight or other distance measurement), and reconfigure itself using the network parameters that are advertised by the closest gate device. In other embodiments, the class B device does not respond to the beacons 310 of all the gate devices, but responds only to the closest gate device. These examples are not limiting, and further the invention is not limited to wireless locks.

A gate device may consume more current than a non-gate class A device.

In many applications, it is desirable for each device to be able to discover any other device rather than being limited to the discovery for opposite device classes. To achieve this, a single device, of class AB, can perform both functions in parallel. For example, in a modification of the protocols described above, a device of class AB can perform both the function of a class A device and a function of a class B device. Thus, some or all devices could be of class AB, while other devices in the same system could be of class A or B. For example, in such as system, a class AB device can transmits n broadcast packets 310 with the interval T1, for reception by other class B or AB devices. After transmitting n broadcasts, the class AB device puts its radio into receive mode for a full period T1 (period 330 in the example of FIG. 12).

Figure 12:
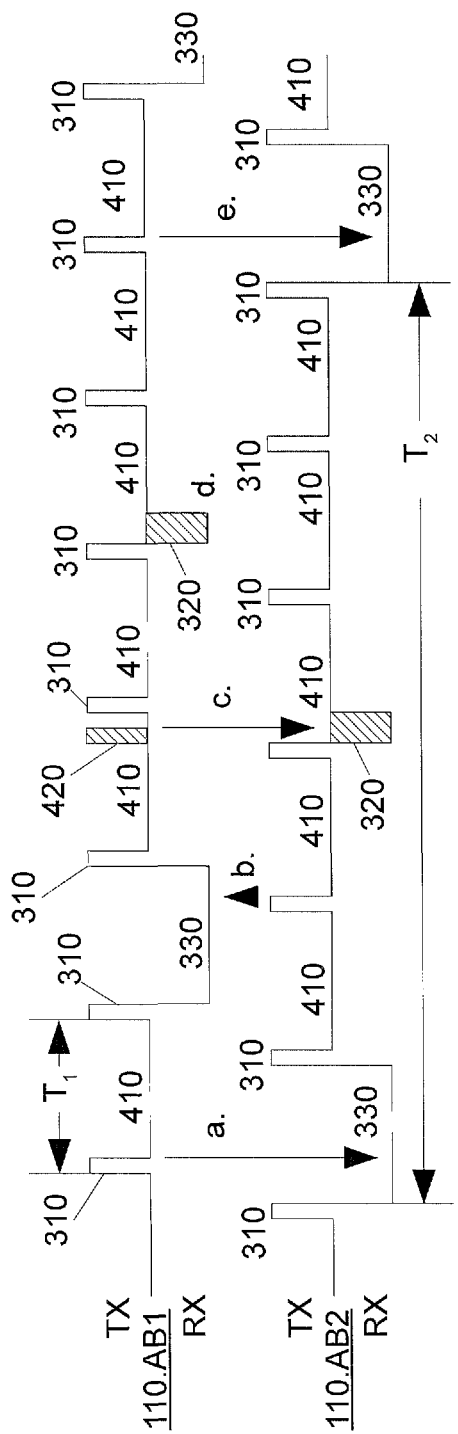
FIG. 12 is a timing diagram of a discovery operation according to some embodiments of the present invention.

FIG. 12 is an exemplary timing diagram of the discovery operation for two class AB devices 110.AB1 and 110.AB2 in some embodiments of the present invention. The reference signs a. through e. denote the following events:

a. During its listening period 330, device 110.AB2 receives a broadcast beacon packet 310 from device 110.AB1 and learns of a response timeslot 320 (at d.) to be offered by device 110.AB1.

b. During its listening period 330, device 110.AB1 receives a broadcast from device 110.AB2 and learns of a response timeslot 320 (at c.) to be offered by device 110.AB2.

c. Device 110.AB2 offers the response timeslot 320. Device 110.AB1 transmits a packet 420 to device 110.AB2. This packet may be used to initiate further communication that is not governed by this protocol, as in other embodiments discussed above.

d. Device 110.AB1 offers a response timeslot 320. However, device 110.AB2 has no need to respond because both devices have just communicated.

e. Device 110.AB2 receives another broadcast 310 from device 110.AB1 but ignores it because both devices have just communicated.

Choice of timeslots for broadcasts 310: In this protocol, it is important that broadcasts 310 of neighboring devices do not overlap. Therefore, some embodiments provide time synchronization between all class A and AB devices and assign to them timeslots for broadcasts 310. The time synchronization may be established by an external apparatus or by the devices involved. However, the synchronization increases the protocol complexity.

In some embodiments, each class A or AB device is configured to periodically listen for the period T1 and take samples of the received signal strength. (A class AB device may accomplish this in its timeslots 330, and/or in additional listening timeslots added to measure the energy on the broadcast 310 channel.) The class A or AB device can then adjust its timeslots 310 to a time when it sees the lowest energy on the channel. In other words, if the lowest energy is detected in a period equal to the length of a broadcast 310 and starting at a time $t_0$, then the device may adjust the future beacons to start at a time $t_0 + n \cdot T1$ where n are consecutive integers starting with a positive value (e.g. n=2, 3, 4, ... ).

One problem with this method is that when the device has the receiver on for a complete interval T1, the device has to skip one broadcast 310.

Figure 13:
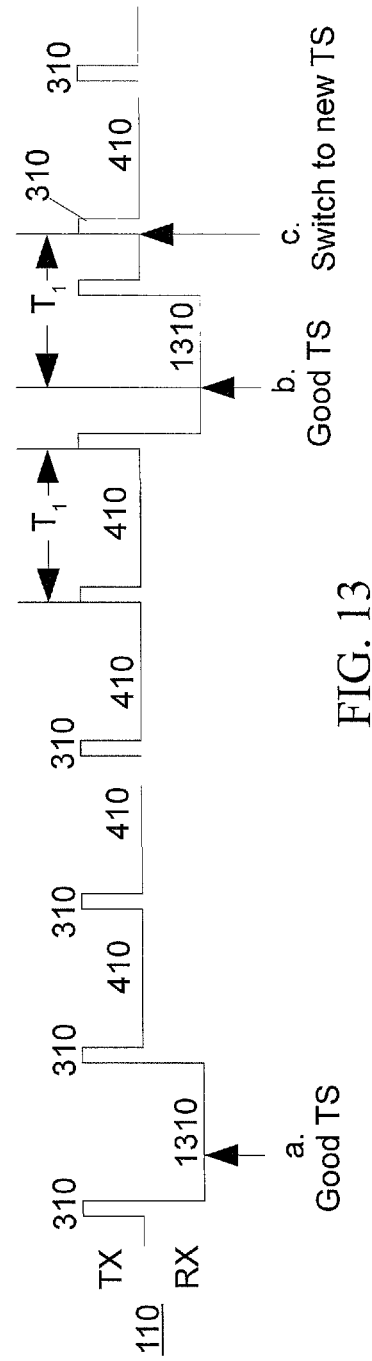
FIG. 13 is a timing diagram of a device adjusting the timing of its discovery operations according to some embodiments of the present invention.

FIG. 13 shows a method that does not require skipping broadcasts 310. The class A or AB device 110 periodically enables its receiver 120R between two broadcasts 310 as shown at 1310. If this is a class AB device, then it can actively receive packets from other devices during the period 1310. In any case, the device 110 takes RF energy samples throughout the period 1310. In the example of FIG. 13:

a. During a period 1310, the device detects a clear channel (e.g. as indicated by low energy or otherwise). The clear channel period which starts at a time a. and lasts for as long as one broadcast 310. The device however decides not to adjust its broadcast 310 timing.

b. During another period 1310, the device detects another clear channel period starting at b. and lasting for as long as one broadcast 310. The device configures itself to change the broadcast 310 timing at the next time c. which is later than b. by the amount T1.

c. The device starts a new broadcast 310 based on the new configuration.

One problem is that the device cannot measure the RF background energy during its own broadcasts 310, so potentially the current timing of broadcasts 310 is not ideal and there is no way to notice, or on the contrary the current timing of broadcasts 310 is ideal but the device may not realize it and switch to new timing. In some embodiments therefore, the device adjusts its broadcast 310 timing preemptively and potentially quite frequently. The switch to new timing is always done in a way that the interval between the starting points of two broadcasts is never more than T1.

Another method to make this protocol more reliable in the presence of a large number of class A or AB devices is to use a modulation format that allows the listening devices' receivers to tune into the strongest transmission, even if two or more devices transmit their broadcasts 310 at the same time. This way, even if two devices have their broadcasts 310 occurring at the same or overlapping times, the device with the least RF path loss would be discovered. Non-limiting examples of suitable modulation formats include FSK (Frequency Shift Keying), PSK (Phase Shift Keying), MFSK (Multiple Frequency Shift Keying), and MSK (Minimum Shift Keying).

Figure 14:
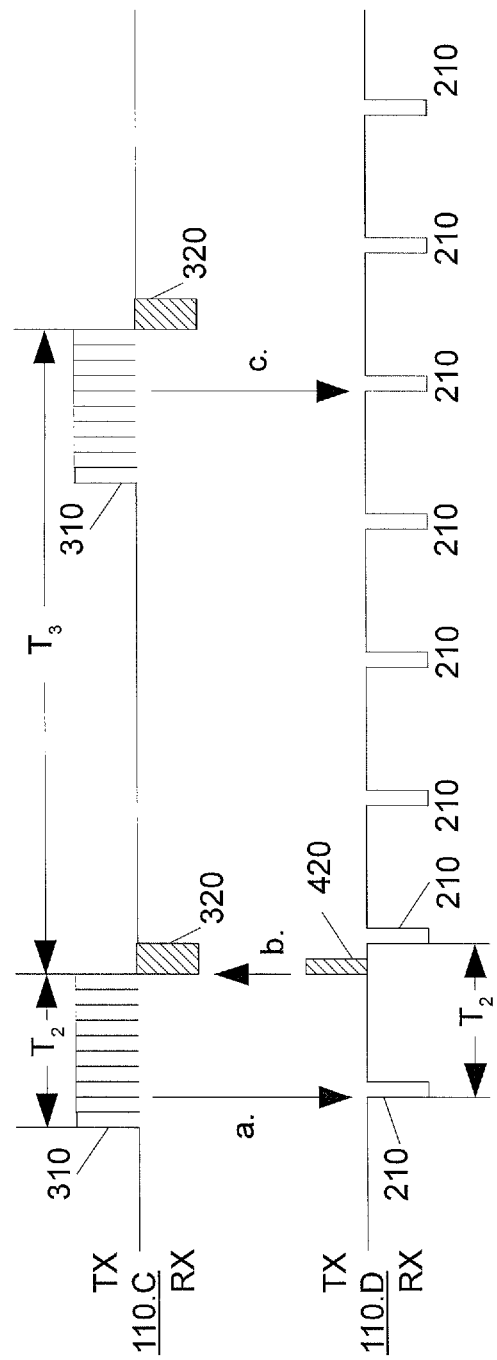
FIG. 14 is a timing diagram of discovery operations according to some embodiments of the present invention.

FIG. 14 depicts a different approach how two devices can discover each other. A device 110.C periodically broadcasts a burst 310 of short radio packets. Such devices will be called "class C" herein. The devices discoverable via such packet bursts will be called "class D". A device can also perform both functions, of class CD.

Class D device 110.D periodically listens for bursts 310 as shown at 210. The duration T2 of each burst 310 is at least as long as the period of listening periods 210. In FIG. 14, the listening periods 210 are repeated with a period T2.

The interval between successive bursts 310 (i.e. between the starting or ending points of successive bursts) is shown as T3. This interval can be as long as desired to reduce the power consumption of the class C device at the expense of increased discovery latency.

Each packet in packet burst 310 contains enough information so that a class D device (e.g. 110.D) can know when and how to respond. For example, each packet may contain the information discussed above in connection with FIG. 5.

FIG. 14 illustrates the following exemplary events a., b., c.:

a. The class D device 110.D receives one of the packets from the burst 310 of the class C device 110.C. The packet contains information about the receive timeslot 320 of device 110.D, and other information, e.g. authentication information 540 (e.g. a counter and message authentication code).

b. The class D device 110.D responds to the class C device 110.C with a packet 420 in the timeslot 320. Now both devices can use different protocols for further communication.

c. The class D device again receives one of the packets from the burst transmission of the class C device, but does not respond.

Figure 1:
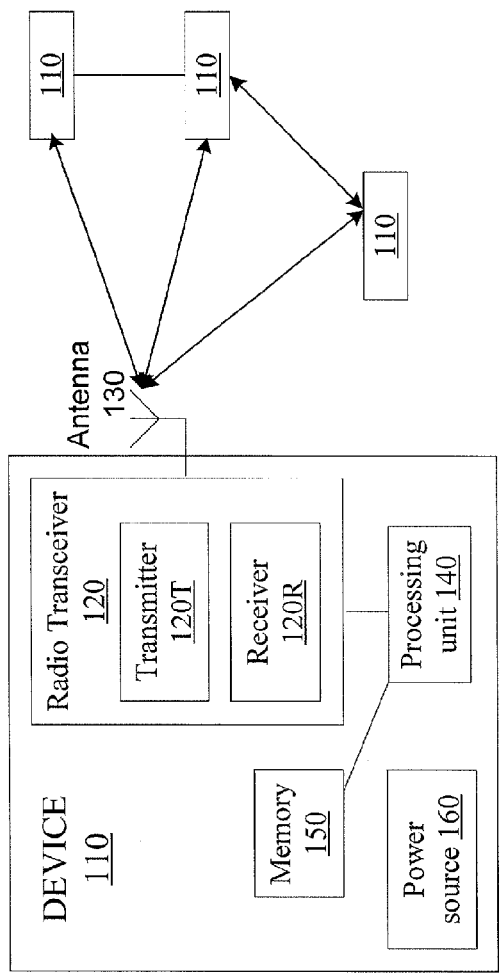
FIG. 1 illustrates a wireless computer network.
Figure 2:
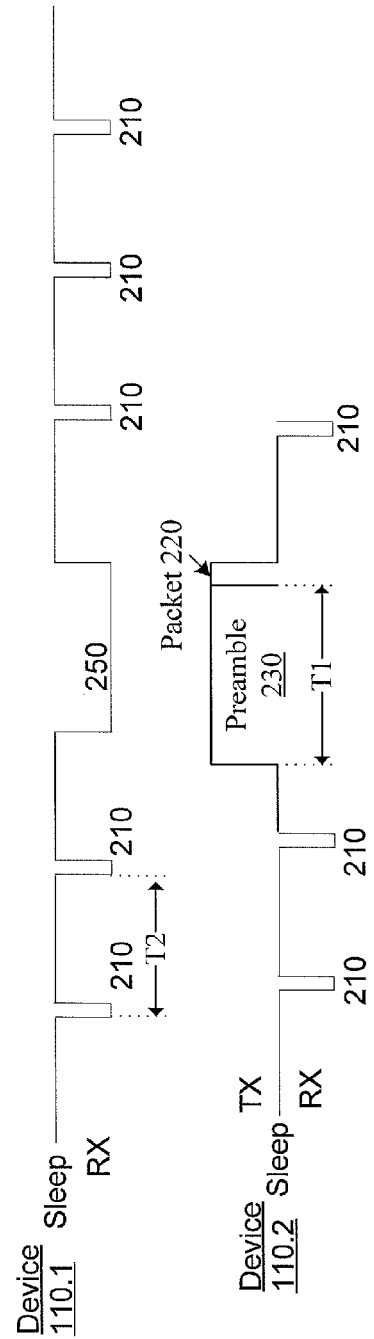
FIGS. 2 and 3 are timing diagrams of discovery operations according to prior art.
Figure 3:

This protocol can be thought of as the inversion of the protocol described earlier with regard to the receive and transmit timing. This protocol is somewhat similar to the B-MAC (FIG. 2) protocol in that the burst 310 is somewhat similar to the preamble. However, the protocol of FIG. 14 is more power efficient because the class D device does not have to remain listening for the duration of the entire burst 310. From a single packet in the burst 310 the class C device knows whether or not to communicate at all, and if it wants to communicate, it can still turn off the radio for the remainder of the burst, because it knows when the listening timeslot 320 will occur. Of course, the protocol of FIG. 14 is different from FIG. 2 in at least one other respect: the bursts 310 are discovery signals, not signals transmitted only when the transmitting device has data to send.

The protocol of FIG. 14 can be extended with features of other protocols described above for class A, B, and AB devices. For example, the listening periods 320 do not have to be provided after each burst 310. (It is noted however that in some embodiments, the energy consumption of a listening period 320 is low compared to a burst 310, so providing a listening period 320 after each burst may be acceptable even in energy sensitive applications, and is desirable in view of the reduced discovery latency; of note, reduced discovery latency serves to further reduce energy consumption.) One or both of the class C and D devices can be replaced with a class CD device, to perform both functions. (Generally speaking, the device class (A, B, C, D, AB or CD) describes the way the device functions but does not necessarily describe the device capability. For example, in some embodiments, the same device can be configured to perform in any class.

As noted above, some embodiments use the discovery protocols discussed herein for wireless lock systems (e.g. door locks, computer access locks, etc.), where wireless key readers (e.g. card readers) have to discover identity tokens (U-Keys, e.g. smart cards) located in readers' vicinity. For example, the reader can be a device of class A, AB, C, or CD, and the U-key can be of class B, AB, D, or CD. The reader can learn the U-key identity (e.g. from a packet 420) and can use the identity to determine whether or not the U-key has the right of access at the current time. The reader can also use the U-key's signal strength to estimate the distance between the reader and the U-key and thus determine whether or not to further communicate with the U-Key.

In some embodiments, once the reader has discovered the U-Key, they periodically exchange radio packets and measure the signal strength, or time of flight, in order to estimate the distance between them. If the distance is below a configurable threshold, the reader and the U-Key engage in a cryptographic challenge-response operation. If this is successful, the reader unlocks the lock, which can be a door lock for example. While the door is unlocked, both devices continue to communicate with each other to estimate the distance. If the distance increases above a certain threshold, the reader locks the door, and if the distance increases even more, the devices stop communicating.

In some embodiments, the devices 110 are part of a personal wireless network (a network of closely spaced devices, e.g. devices on a desk top such as a computer, a computer monitor, a printer, and a computer mouse).

Some embodiments provide a wireless discovery method for one or more devices to perform wireless discovery according to a predefined discovery protocol. The discovery protocol specifies that at least one of the devices is to perform an operation (1) comprising:

(1a) performing one or more first sequences of first discovery transmissions, each first discovery transmission comprising transmission of at least one broadcast packet (e.g. 310 or 310.*i*; a first sequence can be, for example, of sequence of packets 310 between listening periods 1310 in FIG. 13), wherein an interval between starting times of each two consecutive first discovery transmissions is not to exceed a first predefined value T1;

(1b) intermittently listening for responses to first discovery transmissions (e.g. at 320);

(1c) entering sleep mode between each two successive first discovery transmissions within each first sequence in the absence of a response to any first discovery transmission (the sleep mode may or may not be entered if the response is present).

The discovery protocol specifies that at least one of the devices is to perform an operation (2) comprising:

(2a) performing one or more second sequences of first listening operations (e.g. 330) to listen for the first discovery transmissions, wherein the duration of each first listening operation is at least T1;

(2b) entering sleep mode between each two successive first listening operations within each second sequence in the absence of detecting a first discovery transmission (the sleep mode may or may not be entered if a first discovery transmission is detected).

Some embodiments provide a wireless discovery method (see e.g. FIG. 14) in which the discovery protocol specifies that at least one of the devices is to perform an operation (1) comprising:

(1a) performing a sequence of first discovery transmissions, each first discovery transmission comprising transmission of a burst of broadcast packets, wherein each burst lasts at least a first predefined value T2;

(1b) intermittently listening for responses to first discovery transmissions;

(1c) entering sleep mode between each two successive first discovery transmissions within each first sequence in the absence of a response to any first discovery transmission;

wherein the discovery protocol specifies that at least one of the devices is to perform an operation (2) comprising:

(2a) performing one or more second sequences of first listening operations to listen for the first discovery transmissions, wherein an interval between starting times of each two consecutive first listening operations does not exceed T1;

(2b) entering sleep mode between each two successive first listening operations within each second sequence in the absence of detecting a first discovery transmission.

In some embodiments, any two successive operations (2a), i.e. first listening operations, are separated by plural first discovery transmissions.

In some embodiments, at least one of the devices performing the operation (1) also performs operations of:

performing one or more listening operations (such as 1310) between first discovery transmissions of different sequences, to sense wireless activity;

based on the sensed wireless activity, determining whether or not to change a timing of the first discovery transmissions of one or more of the sequences, and if it is determined that the timing is to be changed, then changing the timing.

In some embodiments, at least one broadcast packet of at least one first discovery transmission indicates a timeslot (e.g. 320) during which the device performing the first discovery transmission will be listening for responses.

In some embodiments, the operation (1) is performed by a plurality of devices whose first discovery transmissions are detectable from a single location but do not overlap due to a synchronization between the devices of the plurality.

In some embodiments, the one or more of the devices performing the operation (1) include one or more devices located in an area and include an additional device (e.g. a gate device) located at an entrance to the area. Each first discovery transmission of the additional device includes a plurality of the broadcast packets (see e.g. FIG. 11). At least two of the broadcast packets in each first discovery transmission of the additional device have different formats and/or are transmitted on different channels, to inform a receiving device of one or more parameters used by the one or more of the devices performing the operation (1) in the area.

Some embodiments include computer readable media (disks, semiconductor memory, or other media) comprising computer instructions operable to cause a device comprising a wireless transceiver and one or more computer processors to perform a method or methods discussed above. In some embodiments, such computer instructions can be downloaded into the device over a network, e.g. a wireless network, or from the one or more computer readable media.

The invention is not limited to the embodiments described above. In particular, the invention is not limited to a particular type or use of wireless network. Radio frequencies (RF) can be used throughout in the embodiments described above, but other frequencies are also possible. For example, optical, infrared, and other frequencies can be used. The invention includes both single-function devices (e.g. wireless keys) and multifunction devices (e.g. smart phones that may or may not include wireless key functions). The invention is not limited to any particular combination of features described above or recited in the claims; any number of these features can be combined in any other desirable way. Other embodiments and variations are within the scope of the invention, as defined by the appended claims.

The invention claimed is:

1. A wireless discovery method for one or more devices to perform wireless discovery according to a predefined discovery protocol, the method comprising a first wireless device performing an operation (1) comprising:

(1a) performing one or more first sequences of first discovery transmissions, each first discovery transmission comprising transmission of at least one broadcast packet, wherein an interval between starting times of each two consecutive first discovery transmissions is not to exceed a first predefined value T1;

(1b) intermittently listening for responses to first discovery transmissions from one or more devices performing an operation (2);

(1c) entering sleep mode between each two successive first discovery transmissions within each first sequence in the absence of detecting a response to any first discovery transmission;

wherein the operation (2) comprises:

(2a) performing one or more second sequences of first listening operations to listen for the first discovery transmissions, wherein the duration of each first listening operation is at least T1;

(2b) entering sleep mode between each two successive first listening operations within each second sequence in the absence of detecting a first discovery transmission.

2. The method of claim 1 further comprising performing the operation (2) by a second wireless device which, in operation (2a), detects a first discovery transmission from the first wireless device.

3. A wireless discovery method for one or more devices to perform wireless discovery according to a predefined discovery protocol, the method comprising a first wireless device performing an operation (1) comprising:
- (1a) performing a sequence of first discovery transmissions, each first discovery transmission comprising transmission of a burst of broadcast packets, wherein each burst lasts at least a first predefined value T2;
- (1b) intermittently listening for responses to first discovery transmissions from one or more devices performing an operation (2);
- (1c) entering sleep mode between each two successive first discovery transmissions within each first sequence in the absence of detecting a response to any first discovery transmission;

wherein the operation (2) comprises:
- (2a) performing one or more second sequences of first listening operations to listen for the first discovery transmissions, wherein an interval between starting times of each two consecutive first listening operations does not exceed T2;
- (2b) entering sleep mode between each two successive first listening operations within each second sequence in the absence of detecting a first discovery transmission.

4. A wireless discovery method for one or more devices to perform wireless discovery according to a predefined discovery protocol in which at least one wireless device performs an operation (1) and at least one other wireless device performs an operation (2), the method comprising a wireless device performing the operation (2) which comprises:
- (2a) performing one or more sequences of first listening operations to listen for first discovery transmissions from another wireless device performing the operation (1), wherein the duration of each first listening operation is at least a first predefined value T1;
- (2b) entering sleep mode between each two successive first listening operations within each sequence of the first listening operations in the absence of detecting a first discovery transmission;

wherein the operation (1) comprises:
- (1a) performing one or more first sequences of first discovery transmissions, each first discovery transmission comprising transmission of at least one broadcast packet, wherein an interval between starting times of each two consecutive first discovery transmissions is not to exceed T1;
- (1b) intermittently listening for responses to first discovery transmissions from one or more devices performing the operation (2);
- (1c) entering sleep mode between each two successive first discovery transmissions within each first sequence in the absence of detecting a response to any first discovery transmission.

* * * * *